United States Patent [19]

Buch et al.

[11] Patent Number: 5,239,634

[45] Date of Patent: Aug. 24, 1993

[54] MEMORY CONTROLLER FOR ENQUEUING/DEQUEUING PROCESS

[75] Inventors: Bruce D. Buch, Westborough; Cecil D. MacGregor, Milford, both of Mass.

[73] Assignee: Digital Equipment Corporation, Maynard, Mass.

[21] Appl. No.: 410,600

[22] Filed: Sep. 21, 1989

[51] Int. Cl.[5] ............... G06F 9/00; G06F 9/34; G06F 12/00; G06F 13/00
[52] U.S. Cl. .................. 395/400; 395/425; 395/775
[58] Field of Search ... 364/200 MS File, 900 MS File; 395/400, 425, 775

[56] References Cited

U.S. PATENT DOCUMENTS

| | | | |
|---|---|---|---|
| 4,682,284 | 7/1987 | Schrofer | 364/200 |
| 4,757,441 | 7/1988 | Buckland et al. | 364/200 |
| 4,980,852 | 12/1990 | Giroir et al. | 395/775 |
| 5,008,816 | 4/1991 | Fogg, Jr. et al. | 364/200 |
| 5,050,066 | 9/1991 | Myers et al. | 395/775 |

Primary Examiner—Joseph L. Dixon
Assistant Examiner—Michael A. Whitfield
Attorney, Agent, or Firm—Arnold, White & Durkee

[57] ABSTRACT

A memory controller manipulated enqueuing and dequeuing process for singly linked queues in a memory system in response to single exclusive-access write and read commands from any CPU in the associated data processing system.

11 Claims, 4 Drawing Sheets

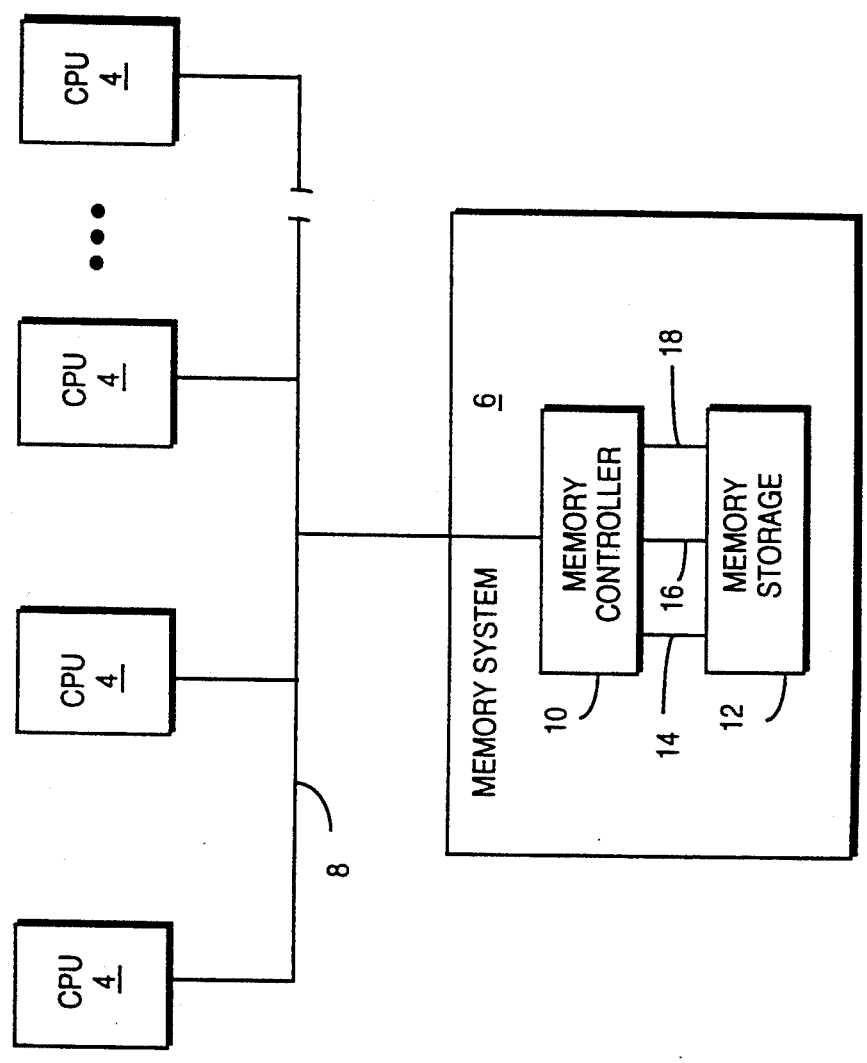

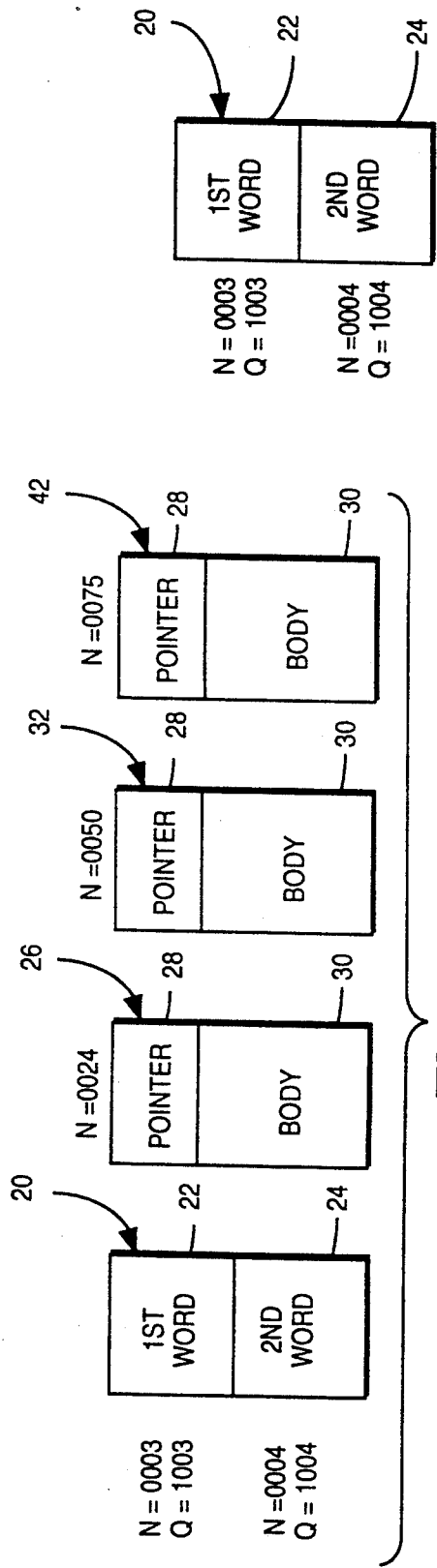
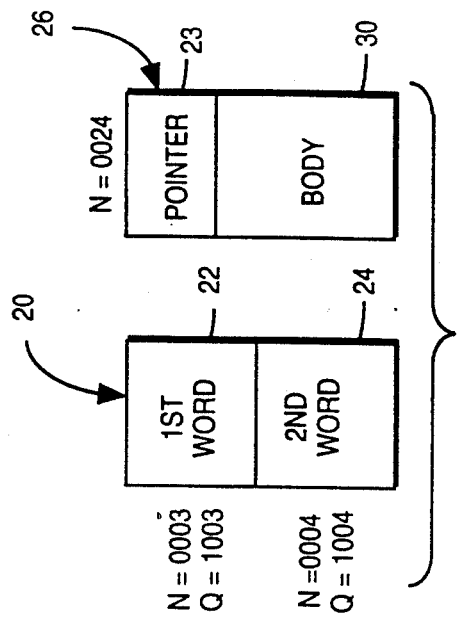
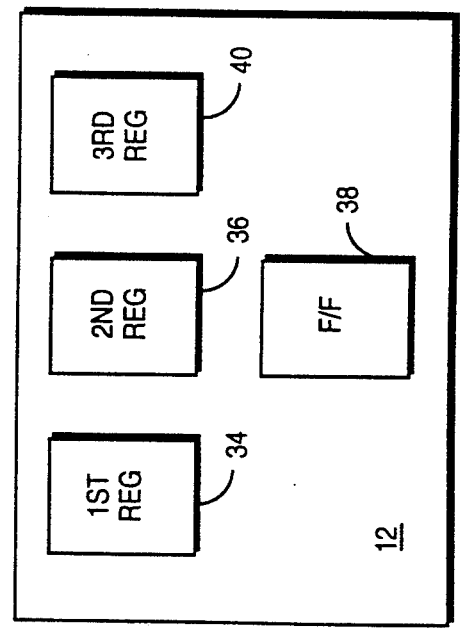

MEMORY CONTROLLER FOR ENQUEUING/DEQUEUING PROCESS

FIELD OF THE INVENTION

The present invention relates to enqueuing and dequeuing operations for a memory system, and more particularly to an enqueuing and dequeuing process for the memory controller of memory systems in a data processing system.

BACKGROUND OF THE INVENTION

Computer systems which have either single or multiple central processing units (CPU's) coupled to an associated memory system often perform queue operations to organize related blocks of stored data. Queues are data structures used to organize sets of data blocks in memory by means of pointers associated with each data block in the queue. In the case of "singly linked" queues, these pointers reference the addresses of successive data blocks, or "members", in the queue. A "singly-linked" queue is a queue in which each member includes a pointer to its successor in the queue. In this context "enqueuing" means adding a data block to the queue, and "dequeuing" means removing a data block from the beginning of the queue.

CPU's perform queue manipulations by executing a sequence of read and write operations which are issued to the memory system. Some CPU's include such manipulations in their instruction repertoire, while others require explicit programming of the individual steps involved. In either case, the data which is read and written during the queue manipulation passes into and out of the CPU. In systems with multiple CPU's served by a single memory controller, the CPU's must take explicit actions to assure that queue manipulations are "atomic" sequences. "Atomic" sequences provide exclusive access to the memory controller when one of the CPU's begins a queue manipulation until that CPU finishes the queue manipulation. Otherwise, the sequence of operations necessary to perform a proper queue modification by one CPU would be corrupted by the operations of another CPU simultaneously modifying the same queue. This can leave the queue in an inconsistent state.

One method of assuring such atomic sequences for the queue manipulation is to use data semaphores to implement an exclusive access policy. The semaphores are used to lock access to an associated queue, a section of the memory, or all of the memory. Another method is to supply a hardware signal that is asserted to request the memory controller to provide exclusive access to the memory or a section of the memory when a CPU is to execute queue manipulation instructions. This method requires that all of the CPU's in the system have compatible exclusive-access requesting mechanisms to implement a collaborative exclusive-access policy. This method also requires that the memory controller be designed to interpret the exclusive-access requesting signals asserted by the CPU's.

SUMMARY OF THE INVENTION

The present invention expedites queue manipulation and provides automatic exclusive access during queue manipulations by a combination of arranging the memory system to "doubly map" at least part of the memory with the memory controller and executing special sequences of events with the memory controller in response to ordinary read and write commands from associated CPU's. This technique allows any CPU in the system to execute an atomic "enqueuing" operation with a single write command, and to execute an atomic "dequeuing" operation with a single read command.

DESCRIPTION OF THE DRAWINGS

FIG. 1 is a data processing system suitable for incorporating the present invention.

FIG. 2 is a block diagram of a multi-member singly-linked queue.

FIG. 4 is a block diagram of apparatus suitable for implementing the enqueuing and dequeuing methodology of the present invention.

FIG. 5 is a block diagram of a singly-linked queue with a newly added queue.

FIG. 7 is a block diagram of an empty queue.

DESCRIPTION OF THE PREFERRED EMBODIMENT

Figure 3:
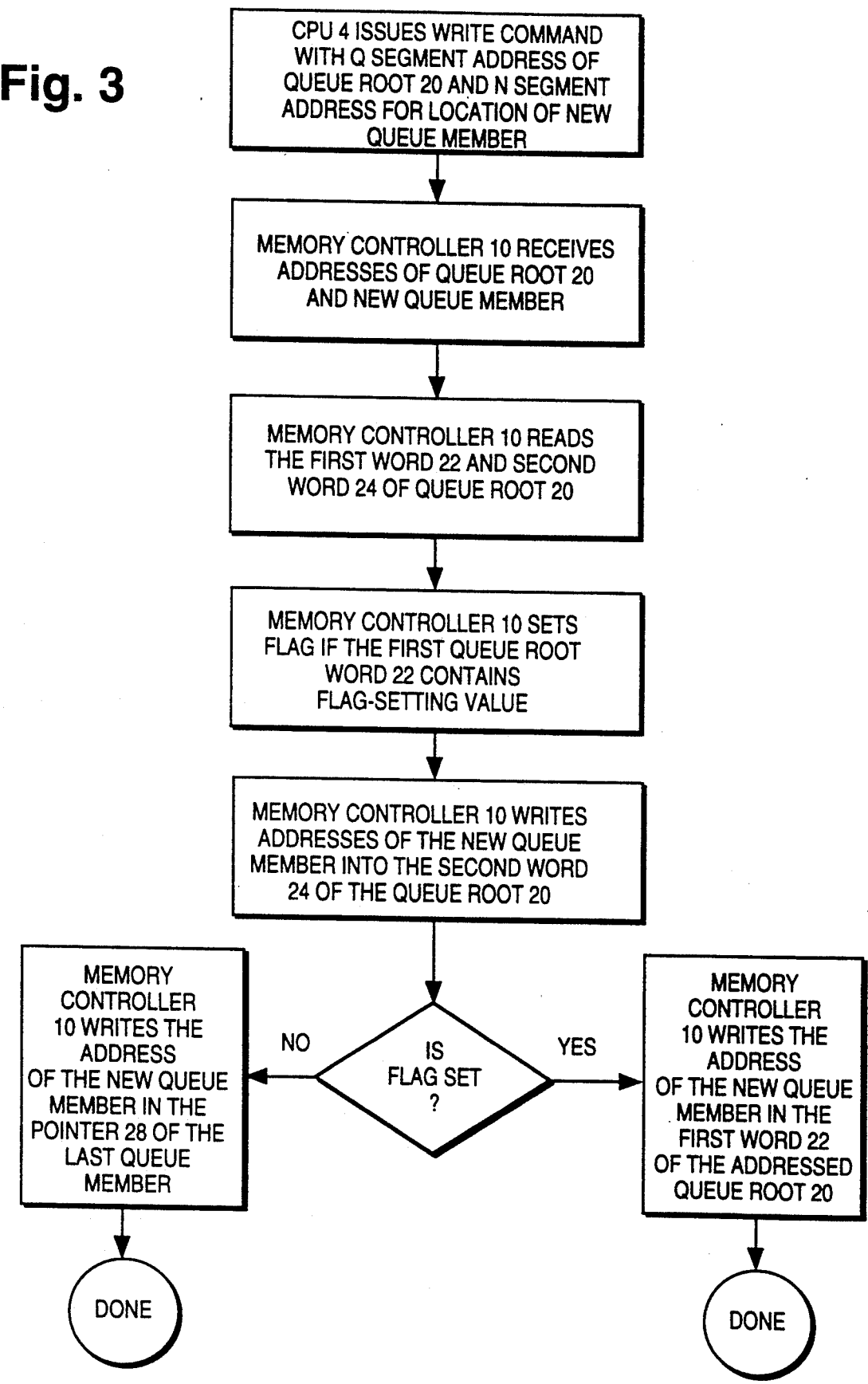
FIG. 3 is a flow chart for the enqueuing methodology of the present invention.

Referring to the drawings, wherein reference characters designate like or corresponding parts throughout the views, FIG. 1 shows the arrangement of a typical data processing system in which the present invention is used. A data processing system 2 typically comprises a plurality of CPU's 4. Although four of the CPU's 4 are shown in FIG. 1, the system 2 may have a greater or lesser number of the CPU's 4, but at least one of the CPU's 4. The CPU's 4 are coupled to a shared memory system 6 via a common data bus 8.

The memory system 6 includes a memory controller 10 coupled to the data bus 8 which processes read and write commands from the CPU's 4. The memory controller 10 manipulates data to and from a memory storage unit 12 via a memory address line 14 and a memory data line 16 in response to a memory control line 18.

In the preferred embodiment of the invention, the memory controller 10 "doubly maps" at least a portion of the memory storage in the memory unit 12 so that each queue is contained in the doubly mapped section of memory. Alternatively, the entire memory of the memory storage unit 12 may be "doubly mapped". "Doubly mapped" means that each memory location in the doubly mapped section of memory may be reached by two different addresses, allowing the CPU's 4 to reach selected memory locations by either one of two addresses. For instance, memory locations with first addresses 0000 to 0999 may have corresponding second addresses 1000 to 1999.

Although the same memory locations may be reached with two different addresses in this way, the different addresses may be used to signal the memory controller 10 to operate on the addressed memory location in different ways, depending on the address used.

In the preferred embodiment, the memory controller 10 processes a first segment of addresses for the doubly mapped memory section as a "standard or normal (N) segment", which means that read and write operations executed by the CPU's 4 are interpreted by the memory controller 10 to mean ordinary read or write operations at the selected memory location designated by the N segment address. However, the memory controller 10 processes a second segment of addresses for the doubly mapped memory section as an "alternative or queue (Q) segment", which means that read and write operations executed by the CPU's are interpreted by the memory controller 10 to mean queue manipulations at the selected memory location designated by the selected address. In this way, the memory controller 10 provides exclusive access by any CPU which executes a read or write command with a Q segment address.

The write command with a Q segment address signifies an enqueuing manipulation, while a read command with a Q segment address signifies a dequeuing operation. Specifically, if a write command from one of the CPU's 4 is issued to the memory system 6 to write data "D" to a memory location at Q segment address A, the memory controller 10 interprets this write command to enqueue the data at the address D onto the tail of a singly linked queue having its "root" at the address A. Likewise, if a read command from one of the CPU's 4 is issued to the memory system 6 with a Q segment address "A" to retrieve data, the memory controller 10 interprets this read command to dequeue the data from the head member of a singly linked queue having its root at the address A. The queue root is a two word structure containing pointers, or memory locations, which indicate the head and tail members of the queue for a singly-linked queue. The tail member has a pointer with a special identifier, such as "0", which indicates it is the tail member of the queue. The present invention allows singly-linked queues to be enqueued and dequeued with ordinary read and write commands from the CPU's 4 when the queue roots are arranged in the doubly mapped portion of the memory unit 12. A write command to the Q segment address of the queue root serves to enqueue a new queue member onto the tail of the queue with data supplied according to the write command. A read command to the Q segment address of the queue root serves to dequeue the queue with data supplied by the head member of the queue. The memory controller 10 provides exclusive access for these commands because they are made to a Q segment address, thus ensuring that the enqueuing and dequeuing manipulations are atomic.

A singly-linked queue is shown in FIG. 2. A queue root 20 has a two word structure, with a first word 22 and a second word 24. The queue root 20 is located in a portion of the memory unit 12 which is doubly mapped, and has a queue root address which is addressable by the segment address of the first root word 22 of the queue root 20. For instance, assume the N segment addresses of the doubly mapped memory portion of the memory unit 12 extend from 0000 to 0999 and the Q segment addresses extend from 1000 to 1999. If the first queue root word has an N segment address of 0003 and a Q segment address of 1003, the queue root 20 is addressable by any of the CPU's 4 with commands sent to the memory system 6 which are directed to the Q segment address 1003. The second queue root word 24 has an N segment address of 0004 and a Q segment address of 1004, since it occupies the next data word location in the memory unit 12. Note that conventional write and read operations can be performed on the words of the queue root by addressing them with their respective N segment addresses.

The first queue root word 22 contains the N segment address of a first member 26 of the queue, for instance, 0024. The first member 26 is a data block which has a location in the memory which begins with the word address contained by the first queue root word 22 of the queue root 20. The first member 26 comprises a "pointer" 28 and a data "body" 30. The pointer 28 is a memory location in the first member 26 which contains the N segment address of a second member 32 of the queue, for instance, 0050. The data body 30 contains the stored data for the first member 26. Although the pointer 28 is shown as being in the first word position of the first member 26, it may have any desired position in the first member 26, such as in the middle or at the end.

The second member 32 of the queue also has a pointer 28 and a data body 30. The second member 32 is the last member of the queue in this example, so the pointer 28 of the second member 32 has a special indicator value, for instance, "0". This signifies that it is the last member of the queue, and that it does not contain the N segment address of a subsequent queue member. The second queue root word 24 of the queue root 20 contains the N segment address of the last member of the queue, in this case, the second member 32. Consequently, the queue root 20 contains two addresses, 0024 in the first queue root word 22, and 0050 in the second queue root word 24. The first member 26 contains the address 0050 in its pointer 28 and the second member 32 contains the value 0 in its pointer 28. The data block 42 in FIG. 2 is described hereinafter.

FIG. 3 is a basic flow chart for enqueuing the queue in accordance with the present invention. As part of a write command from one of the CPU's 4, the Q segment address of the queue root 20 for a selected queue is issued. The N segment address of a selected location for the beginning of a new member is also issued as the write operation data. The queue root address and the new member address are both read by the memory controller 10. The memory controller 10 then reads the first and second words 22 and 24 of the addressed queue root 20. The memory controller 10 sets a flag if the first queue root word 22 contains a selected flag-setting value that indicates that the queue is empty. The memory controller 10 then writes the address of the new member into the second word 24 of the queue root 20. If the flag is not set, the memory controller 10 writes the address of the new member in the pointer 28 of the last existing queue member to point to the new member. If the flag is set, the memory controller 10 writes the address of the new member in the first word 22 of the addressed queue root 20 to indicate that the new member is the one and only member of the queue.

When one of the CPU's 4 issues a write command to enqueue an additional member onto the queue shown in FIG. 2, the CPU 4 addresses the queue root 20 at the address 1003 to enqueue an additional member at a selected N segment address, for instance, 0075. This is done by writing data 0075 to address 1003. The memory controller 10 stores the address 003 of the queue root 20 and 0075 which is the address of the new member to be enqueued. This is most easily done with a first storage register 34 and a second storage resistor 36, as shown in FIG. 4. The memory controller 10 then reads the first word 22 and the second word 24 of the queue root 20 addressed by the Q segment address stored in the first register 34. If the first word 22 stores a value of "0", this means that the queue is empty and has no members. In the case of an empty queue, the second word 24 would have some intermediate value with no meaning.

If the first word 22 stores a value of "0", the memory controller 10 sets a "flag", most easily done by setting a flip-flop 38. In this example, the flip-flop 38 is not set, since the first word 22 contains the address 0024. The memory controller 10 then stores the address in the second word 24, most easily done by storing the address in a third storage register 40. For this example, the address in the second word 24 which is stored in the third storage register 40 is 0050, the address of the second member 32. The memory controller 10 then writes the address stored in the second register 36 to the second word 24, thereby replacing the address 0050 with the address 0075.

If the flip-flop 38 is not set, as in this case, the memory controller 10 writes the address stored in the second register 36 into the pointer 28 of the member having the address stored in the third register 40. In this example, the pointer 28 of the second member 32 changes in address from "0" to 0075. If the flip-flop 38 is set, the address stored in the second storage register 36 is written into the first word 22. The third member 42 also has a pointer 28 and a data body 30. The pointer 28 has an indicator value such as the value "0", signifying the end of the queue. This indicator value is written to the pointer 28 of member 42 by CPU 4 before the member is enqueued. The enqueuing process for adding a member onto a queue containing existing members with a simple write command from one of the CPU's 4 is thus complete. The queue root 20 correctly holds the address 0024 in its first word 22, indicating the N segment address of the first member 26, and the address 0075 in its second word 24, indicating the N segment address of the third member 42, which is the last member in the queue.

The singly-linked queue with only the empty root 20 is shown in FIG. 5. The queue root 20 has a Q segment address, for instance 1003, so that its first word 22 has a Q segment address of 1003 and its second word has a Q segment address of 1004. Since the queue is empty, the first word 22 simply contains an indicator signifying that the queue is empty, for instance, "0". Since the queue is empty, the second word 26 has any indeterminate value, for instance, "1100".

When one of the CPU's 4 issues a write command to enque a member onto the queue, the CPU 4 addresses the queue root 20 at the address 1003 to write a new member at a selected N segment address, for instance, 0024. The memory controller 10 stores the address 0003 of the queue root 20 in the first register 34 and address 0024 at which is the new member to be enqueued in the second register 36. The memory controller 10 then reads the first word 22 and the second word 24. Since the value of the first word 22 is "0", indicating that the queue is empty, the memory controller 10 sets the flip-flop 38. The memory controller 10 stores the value 1100 of the second word in the third register 40. The memory controller 10 then writes the address 0024 stored in the second register 36 into the second word 24, thereby replacing the value 1100 with the address 0024. If the flip-flop 38 were not set, the address 0024 would be written into the pointer 28 of a member addressed by the address having the value 1100, which does not exist. However, since the flip-flop 38 is set, the memory controller 10 writes the address 0024 from the second register 36 into the first word 22, thereby replacing the value "0" with the address 0024. The pointer of the member 26 has an indicator value, such as the value "0", signifying the end of the queue. This indicator value is written in the pointer 23 by CPU 4 before enqueuing. The enqueuing process for adding a member onto an empty queue with a simple write command is thus complete. The queue root 20 correctly holds the address 0024 in its first word 22, indicating the N segment address of the first member 26, and the address 0024 in its second word 24, indicating the N segment address of the last member, which in this case is just the first member 26. The flip-flop 38 changes the sequence of steps for loading an empty queue to prevent the memory controller from writing a new member at the indeterminate address in the second word 24 of the queue root 20, such as at "1100" in this example.

Figure 6:
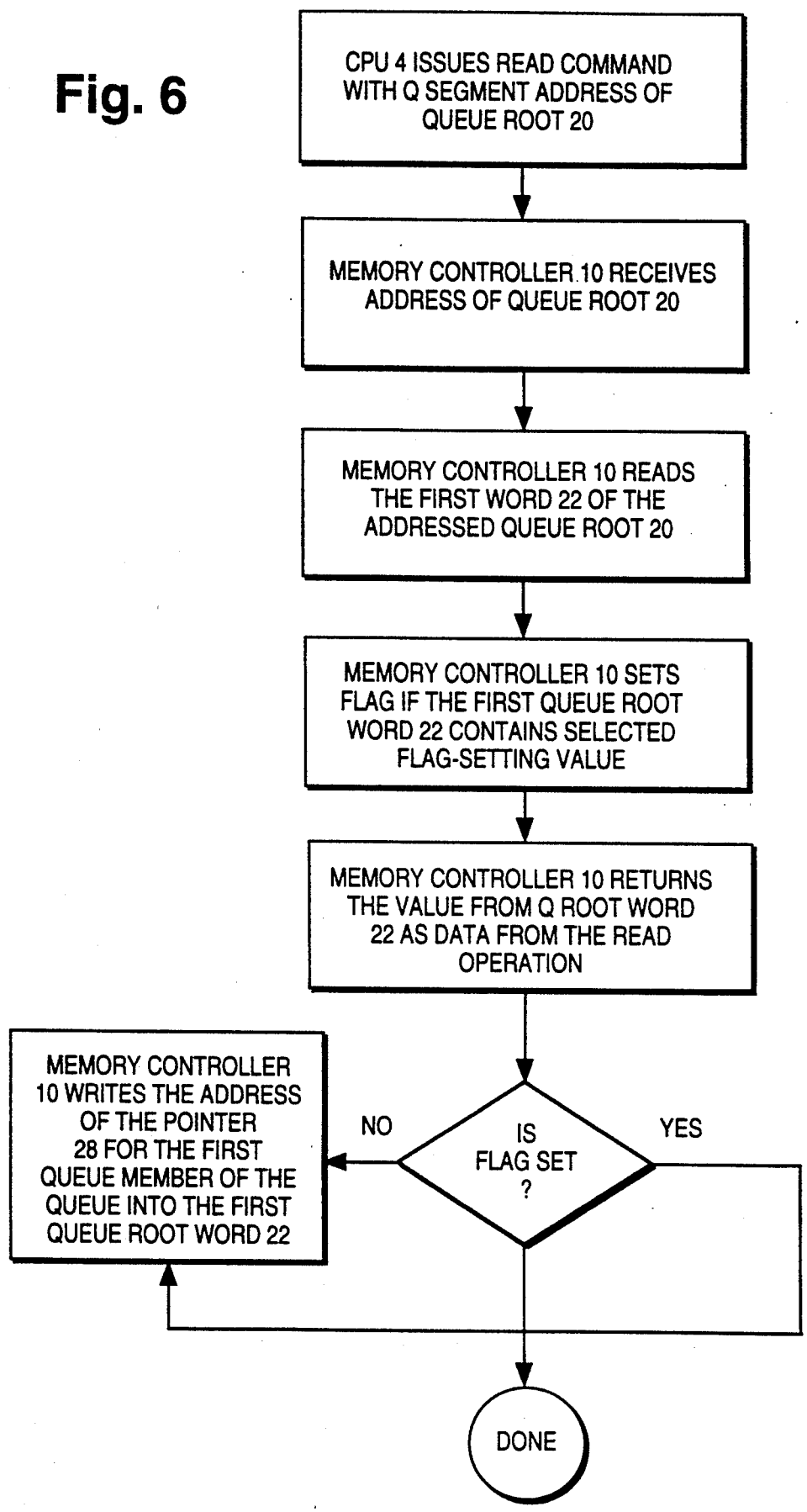
FIG. 6 is a flow chart for the dequeuing methodology of the present invention.

FIG. 6 is a basic flow chart for dequeuing the queue in accordance with the present invention. As part of a read command from one of the CPU's 4, the Q segment address of the queue root 20 for a selected queue is issued. The Q segment address is read by the memory controller 10. The memory controller 10 then reads the first word 22 of the addressed queue root 20. The memory controller 10 sets a flag if the first queue root word 22 contains a selected flag-setting value. The memory controller 10 returns to CPU 4 the value fetched from queue root word 22 as data from the read operation. If the flag is not set, the memory controller writes the address of the pointer 28 for the first member of the queue into the first queue root word 22.

When one of the CPU's 4 issues a read command to dequeue a member when it holds the three members 26, 32 and 42, as shown in FIG. 2, the CPU 4 addresses the queue root 20 at the Q segment address 1003 to read the address of first member 26 of the queue which is at the N segment address 0024. The memory controller 10 stores the Q segment address 1003 of the queue root 20 in the first register 34. The memory controller 10 then reads the first word 22 of the queue root 20 having the Q segment address 1003. stored in the first register 34 and stores its value 0024 in the third register 40. The flip-flop 38 is set if the value stored in the third register 40 is "0", which would indicate that the queue is empty. However, in this case, the stored value in the third register 40 is 0024, so the flip-flop 38 is not set. The memory controller then transfers this data back to the CPU 4 as read data. This is the address of the first member of the queue. If the flip-flop 38 were set, the dequeuing operation would be complete at this point. However, since the flip-flop 38 is not set, the memory controller 10 reads the value of the pointer 28 in the member addressed by the N segment address 0024 stored in the third register 40. This is the address of second member 32 in this example. The memory controller 10 writes this value in the second register 36. The value of the pointer 28 for the first member 26 is 0050, so this value is stored in the second register 36. The value 0050 stored in the second register 36 is then written in the first word 22 of the queue root 20 addressed by the Q segment address 1003 stored in the first register 34. The dequeuing process for reading and removing a member of a queue with a single CPU-issued read command is thus complete. The queue root 20 correctly holds the N segment address 0050 to address the new head member in the queue, the second member 32, and the address 0075 in its second word 26, indicating that the third member 42 is the last member of the queue.

When one of the CPU's 4 issues a read command to dequeue a member from the empty queue, the CPU 4 addresses the queue root 20 of a queue as shown in FIG. 7. If the queue root 20 has Q segment address of 1003, for instance, its first word at N segment address 003 will have a value indicating the queue is empty, such as "0". The second word 24 at the N segment address 0004 will have some indeterminate value, such as "1100". The memory controller 10 stores the address 003 issued by the CPU 4 in the first register 34. The memory controller then reads the value "0" of the first word 22 of the queue root 20 address by the address 003 stored in the first register 34 and stores it in the third register 40. Since this value is "0", indicating an empty queue, the memory controller 10 sets the flip-flop 38 to indicate that the read queue is empty. Since the flip-flop 38 is set, the dequeuing process of the empty queue is complete. If the flip-flop 38 were not set, the memory controller 10 would read the value of the pointer 28 of the member addressed by the value "0" stored in the third register 40, which does not exist, and the memory controller 10 would then store some indeterminate number in the second register 36. The memory controller 10 would then write the indeterminate number stored in the second register 36 into the first word 22 of the queue root 20 addressed by the Q segment address 1003 stored in the first register 34, which would cause the first word 22 to incorrectly hold some indeterminate number, instead of the indicator value "0" to signify that the queue is empty. The set flip-flop 38 changes the sequence of steps for reading an empty queue to prevent such an error from occurring.

Thus, there has been described herein a process for enqueuing and dequeuing singly-linked queues with the memory controller of a memory system in response to single exclusive-access write and read commands from any CPU in the associated data processing system. It will be understood that various changes in the details, arrangements and configuration of the parts and systems which have been described and illustrated above in order to explain the nature of the present invention may be made by those skilled in the art within the principle and scope of the present invention as expressed in the appended claims.

What is claimed is:

1. A method of performing atomic enqueuing operations by a memory controller on a singly-linked queue in a doubly-mapped memory response to a write command issued by one of a plurality of CPU's, said doubly-mapped memory having a plurality of memory locations, each said memory location mapped with both a standard address and an alternative address, said standard address and said alternative address for each said memory location being different, said singly-linked queue comprising a queue root having a first word containing said standard address for a first member of said queue when said queue has members and containing an empty indication when said queue has no members and a second word containing said standard address for a last member of said queue when said queue has members and an indeterminant value when said queue has no members, said method comprising the steps of:

transmitting from one of said plurality of CPUs a write command, said write command containing said standard address for said first queue member to be enqueued to an empty singly-linked queue and said alternative address in said doubly-mapped memory for a queue root;

receiving said write command at said memory controller;

reading said first and second words of said queue root with said memory controller;

writing said standard address of said first queue member in said second word of said queue root with said memory controller thereby indicating that said first queue member is also the last member of said singly-linked queue; and writing said standard address of said first queue member in said first word of said queue root with said memory controller thereby indicating that the first queue member is the first member of said singly-linked queue.

2. The method as set forth in claim 1, wherein said memory comprises storage means and wherein said step of receiving a write command comprises the steps of:

storing said alternative address of said queue root in said storage means; and storing said standard address of said first queue member in said storage means.

3. The method as set forth in claim 2, wherein said step of writing said standard address of said first queue member in said second word of said queue root comprises the steps of:

storing the contents of said second word of said queue root in said storage means; and storing said standard address of said first queue member in said second word of said queue root in said storage means.

4. The method as set forth in claim 3, wherein said step of writing said standard address of said first queue member in said first word of said queue root comprises the step of:

writing said standard address of said first queue member in said first word of said queue root.

5. A method of performing atomic enqueuing operations by a memory controller on a singly-linked queue in a doubly-mapped memory response to a write command issued by one of a plurality of CPU's, said doubly-mapped memory having a plurality of memory locations, each said memory location mapped with both a standard address and an alternative address, said standard address and said alternative address for each said memory location being different, said singly-linked queue comprising a queue root, at least one intermediate queue member, and a last queue member, said queue root having a first word containing the standard address for one of said intermediate queue members and a second word containing the standard address for said last member of said queue, each intermediate queue member having a data body and a pointer addressing any adjacent queue member, said last queue member having a pointer with a preselected value identifying it as the last quote member and a data body, said method comprising the steps of:

transmitting from one of said plurality of CPUs a write command, said write command containing said standard address for a new queue member and said alternative address in said doubly-mapped memory for a queue root;

receiving said write command at said memory controller;

reading said first and second words of said queue root with said memory controller;

writing said standard address of said new queue member in said pointer of said last queue member with said memory controller thereby adding said new queue member to said singly-linked queue; and writing said standard address of said new queue member on said second word of said queue root with said memory controller thereby indicating that said new queue member is now said last member of said singly-linked queue.

6. The method as set forth in claim 5, wherein said memory comprises storage means and wherein said step of receiving a write command comprises the steps of:
   storing said alternative address of said queue root in said storage means; and
   storing said standard address of said new queue member in said storage means.

7. The method as set forth in claim 6, wherein said step of writing said standard address of said new queue member in said second word of said queue root comprises the steps of:
   storing the contents of said second word of said queue root in said storage means; and
   storing said standard address of said new queue member in said second word of said queue root in said storage means.

8. The method as set forth in claim 7, wherein said step of writing said standard address of said new queue member in said pointer of said last queue member comprises the step of:
   writing said standard address of said new queue member in said pointer of said last queue member.

9. A method of performing atomic enqueuing operations by a memory controller having a storage means on a singly-linked queue in a doubly-mapped memory in response to a write command issued by one of a plurality of CPU's, said doubly-mapped memory having a plurality of memory locations, each said memory location mapped with both a standard address and an alternative address, said standard address and said alternative address for each said memory location being different, said singly-linked queue comprising a queue root and at least one queue member having a pointer, said queue root having a first word containing said standard address for a first member of said queue and a second word containing said standard address for a last member of said queue, said method comprising the steps of:
   transmitting from one of said plurality of CPUs a write command, said write command containing said standard address for a new queue member to be enqueued to said singly-linked queue and said alternative address in said doubly-mapped memory for a queue root;
   receiving said write command at said memory controller;
   storing said alternative address of said queue root in said storage means with said memory controller;
   storing said standard address of said new queue member in said storage means with said memory controller;
   reading said first and second words of said queue root with said memory controller;
   writing said standard address of said new queue member in said pointer of said last queue member with said memory controller thereby adding said new queue member to said singly-linked queue; and
   writing said standard address of said new queue member in said second word of said queue root thereby indicating that said new queue member is now said last member of said singly-linked queue.

10. A method of performing atomic enqueuing operations by a memory controller having a storage means on a singly-linked queue in a doubly-mapped memory in response to a write command issued by one of a plurality of CPU's, said doubly-mapped memory having a plurality of memory locations, each said memory location mapped with both a standard address used for normal read/write operations and an alternative address used for enqueuing operations, said standard address and said alternative address for each said memory location being different, said singly-linked queue comprising a queue root and, if not empty, at least one queue member having a pointer, said queue root having a first word containing said standard address for a first member of said queue when said queue has members and containing an empty indication when said queue has no members and a second word containing said standard address for a last member of said queue when said queue has members and an indeterminant value when said queue has no members, said method comprising the steps of:
   transmitting from one of said plurality of CPUs a write command, said write command containing said standard address for a new queue member to be enqueued to said singly-linked queue and said alternative address in said doubly-mapped memory for a queue root;
   receiving said write command at said memory controller;
   storing sad alternative address of said queue root in said storage means with said memory controller;
   storing said standard address of said new queue member in said storage means with said memory controller;
   reading said first and second words of said queue root with said memory controller;
   setting a flag is said first word of said queue root is a selected flag-setting value representing that said queue is empty;
   writing said standard address of said new queue member in said pointer of said last queue member if said flag is not set with said memory controller thereby adding said new queue member to said singly-linked queue;
   writing said standard address of said new queue member in said first word of said queue root if said flag is set with said memory controller thereby indicating that said new queue member is said first member of said singly-linked queue; and
   writing said standard address of said new queue member in said second word of said queue root with said memory controller thereby indicating that said new queue member is said last member of said singly-linked queue.

11. A method of performing atomic enqueuing operations by a memory controller having a storage means on a singly-linked queue in a doubly-mapped memory in response to a read command issued by one of a plurality of CPU's, said doubly-mapped memory having a plurality of memory locations, each said memory location mapped with both a standard address and an alternative address, said standard address and said alternative address for each said memory location being different, said singly-linked queue comprising a queue root and at least one queue member having a pointer that has a pointer address, said queue root having a first word containing said standard address for said first member of said queue and a second word containing said standard address for said last member of said queue, comprising the steps of:
   transmitting from one of said plurality of CPUs a read command, said read command containing the alternative address in said doubly-mapped memory for a queue root;
   receiving said read command at said memory controller;

reading said first of said queue root with said memory controller;

reading data from a queue member having a standard address corresponding to the value of said first word of said queue root with said memory controller; and writing said pointer address for said first queue member in said first word of said queue root with said memory controller.

* * * * *